No. 782,252.

Patented February 14, 1905.

UNITED STATES PATENT OFFICE.

SIMEON D. KUDYSCH, OF PHILADELPHIA, PENNSYLVANIA.

WOOD-FILLER.

SPECIFICATION forming part of Letters Patent No. 782,252, dated February 14, 1905.

Application filed August 25, 1903. Serial No. 170,715.

*To all whom it may concern:*

Be it known that I, SIMEON D. KUDYSCH, a citizen of the United States, residing in Philadelphia, in the county of Philadelphia and State of Pennsylvania, have invented a new and useful Improvement in Wood-Fillers, of which the following is a specification.

My invention consists of a wood-filler the principal ingredient of which is the residuum or waste product obtained in the process of manufacturing acetic acid from crude commercial lime acetate. The physical condition of this residuum and the percentage of free sulfuric acid therein will of course depend upon the grade of lime acetate treated and the working condition of the plant. Hence the mechanical treatment necessary to convert it into a filling material must be varied to meet the requirements of each batch. In general the treatment consists of grinding it in water, neutralizing it with "milk of lime" or "water of baryta," which also tends to remove the empyreumatic odor and drying. This dry and substantially neutral material is then mixed with a volatile liquid, which may be varied to suit the variety and condition of the wood to be filled. Thus water, alcohol, benzin, or turpentine may be successfully employed. If desired, a coloring-matter may be added; but it is to be understood that the term "colored" in the claims does not refer especially to this possible additional coloring-matter, but to the "colored condition" normally present in the residuum on account of the constituents by which the residuum differs from pure gypsum. The pulp-like filler thus produced may be rubbed and stuffed into the wood in the usual manner, preferably by using an absorptive textile pad, as of cheese-cloth, and by working chiefly across the grain.

The filler is quickly applied, effective, and produces a clear surface with a dark shade, due to the empyreumatic nature of the residuum, which brings out the grain of the wood very distinctly.

Having thus described my invention, what I claim as new, and desire to secure by Letters Patent, is—

1. A wood-filler consisting of the impure colored residuum obtained in the process of manufacturing acetic acid from lime acetate and a volatile liquid.

2. A wood-filler consisting of the impure colored residuum obtained in the process of manufacturing acetic acid from lime acetate neutralized and reduced to a pulp-like condition by combining therewith a volatile liquid.

SIMEON D. KUDYSCH.

Witnesses:
 JOHN A. WIEDERSHEIM,
 GEO. L. COOPER.